United States Patent
Altamirano et al.

[19]

[11] Patent Number: 5,862,655
[45] Date of Patent: Jan. 26, 1999

[54] ADJUSTABLE MOWING AND TRIMMING APPARATUS

[75] Inventors: Rolando Altamirano, Waterford; James M. D'Aleo, Clifton Park; Charles R. Elder, Averill Park; Mathieu J. Grumberg, Delmar; Bruce Roberts, Waterford, all of N.Y.

[73] Assignee: Garden Way Incorporated, Troy, N.Y.

[21] Appl. No.: 726,060

[22] Filed: Oct. 3, 1996

[51] Int. Cl.⁶ .................................... A01D 75/10
[52] U.S. Cl. ........................... 56/12.1; 56/12.7; 56/16.7; 56/17.5
[58] Field of Search ................... 56/12.1, 12.7, 56/16.7, 16.9, 17.5, 10.8, 15.4; 30/276; 280/62, 63, 64

[56] References Cited

U.S. PATENT DOCUMENTS

| | | |
|---|---|---|
| 2,669,826 | 2/1954 | Watrous . |
| 4,077,191 | 3/1978 | Pittinger, Sr. et al. ............... 56/12.7 |
| 4,145,809 | 3/1979 | Prouix .................................. 30/276 |
| 4,182,100 | 1/1980 | Letter ............................... 56/16.9 X |
| 4,550,498 | 11/1985 | Oliver .................................. 30/276 |
| 4,688,376 | 8/1987 | Wolfe, Sr. ............................ 56/16.7 |
| 4,703,613 | 11/1987 | Raymond ............................. 56/12.7 |
| 4,891,931 | 1/1990 | Holland ................................ 56/16.7 |
| 4,909,024 | 3/1990 | Jones et al. .......................... 56/16.7 |
| 4,922,694 | 5/1990 | Emoto .................................. 56/16.7 |
| 5,023,998 | 6/1991 | Masciarella et al. ............. 56/12.7 X |
| 5,048,278 | 9/1991 | Jones et al. ............................ 56/295 |
| 5,092,112 | 3/1992 | Buckendorf, Jr. .................... 56/17.5 |
| 5,095,687 | 3/1992 | Andrew et al. ....................... 56/12.7 |
| 5,174,100 | 12/1992 | Wassenberg .......................... 56/12.7 |
| 5,197,264 | 3/1993 | Lacey ................................... 56/12.1 |
| 5,222,750 | 6/1993 | Ellis ..................................... 56/12.7 |
| 5,287,683 | 2/1994 | Smith ................................... 56/12.7 |
| 5,309,701 | 5/1994 | McGuerty ............................. 56/16.9 |
| 5,313,770 | 5/1994 | Smothers .............................. 56/12.7 |
| 5,408,816 | 4/1995 | Cartier ................................. 56/17.5 |
| 5,450,715 | 9/1995 | Murray ................................. 56/16.9 |
| 5,577,374 | 11/1996 | Huston ................................. 56/12.1 |

*Primary Examiner*—Heather Shackelford
*Attorney, Agent, or Firm*—Heslin & Rothenberg, P.C.

[57] ABSTRACT

An adjustable mowing and trimming apparatus is presented which employs a unique wheel adjust mechanism and trimming assembly. The apparatus includes a frame to which at least two wheels are rotatably mounted at opposite sides of an adjustable linkage which is loosely coupled to the frame through a moveable pivot assembly. A mechanism is provided for manually adjusting the moveable pivot assembly to actuate the adjustable linkage and thereby reorient the wheels on either side of the frame. The trimming assembly is mounted at a front portion of the frame and includes a spindle head fixedly mounted to a spindle depending from the frame so as to rotate with the spindle. The spindle head substantially covers the spindle and is sized such that a distal end thereof rests proximate to ground when the trimming apparatus is operational. A trimmer head is adjustably clamped about the spindle head so as to rotate therewith. The trimmer head has a plane of cutting substantially perpendicular to the axis of rotation of the spindle and the cutting plane is infinitely adjustable within a range defined by a length of the spindle head.

34 Claims, 12 Drawing Sheets

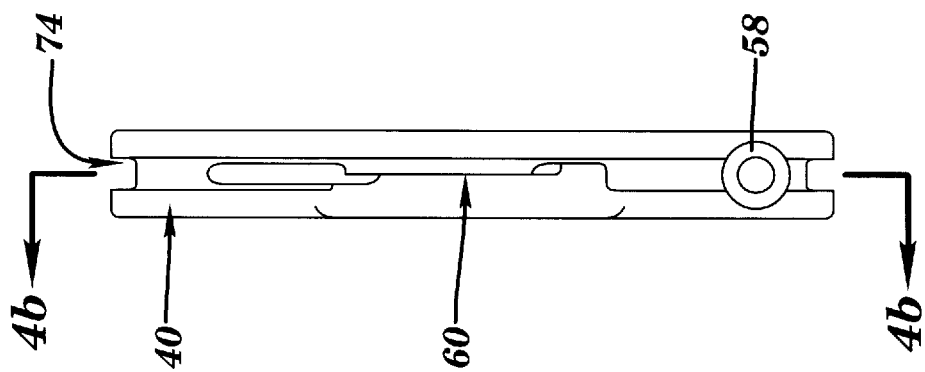
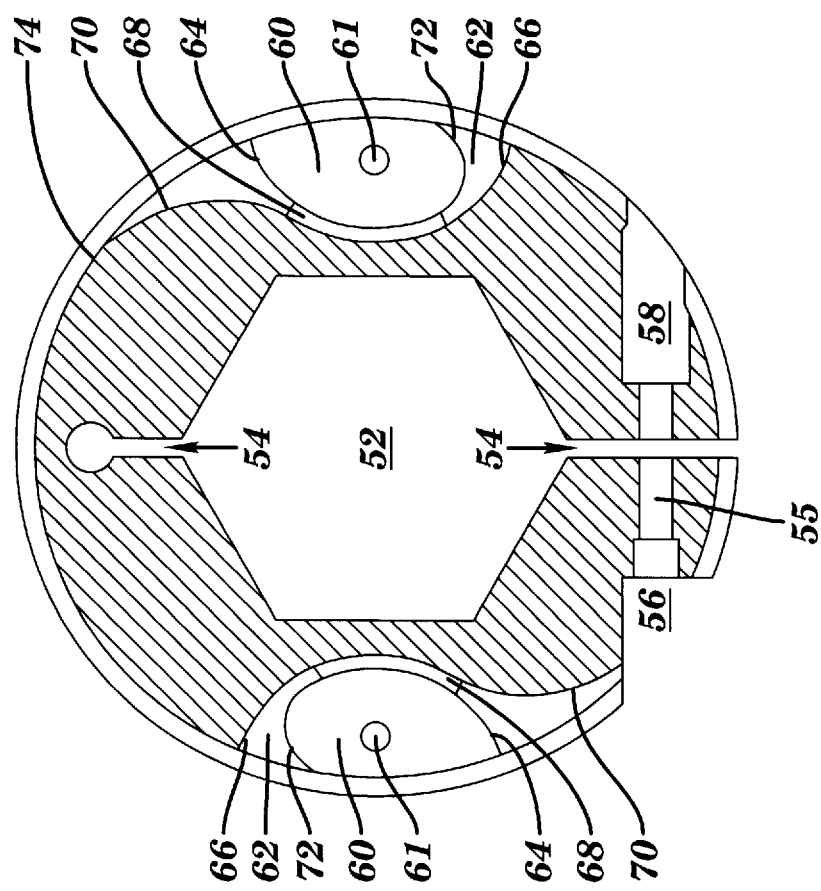

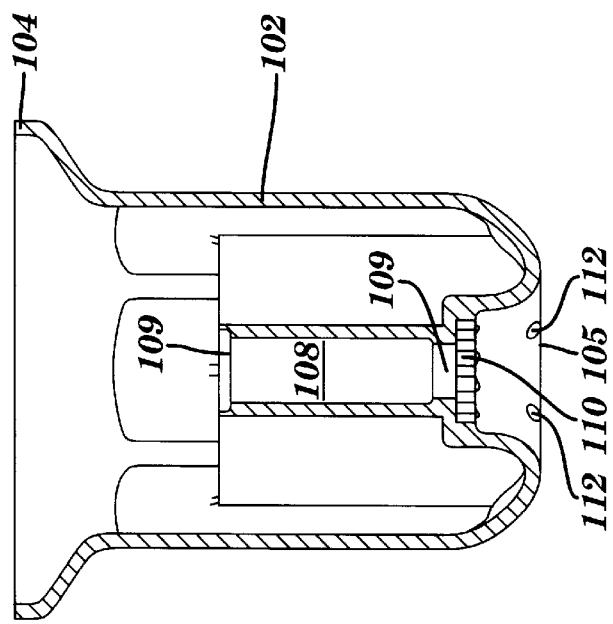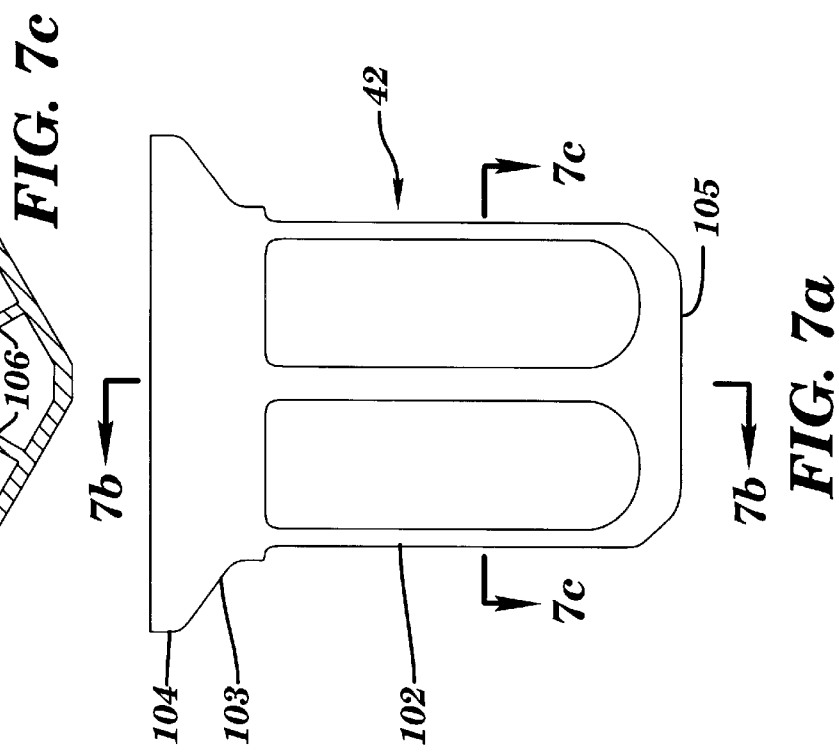

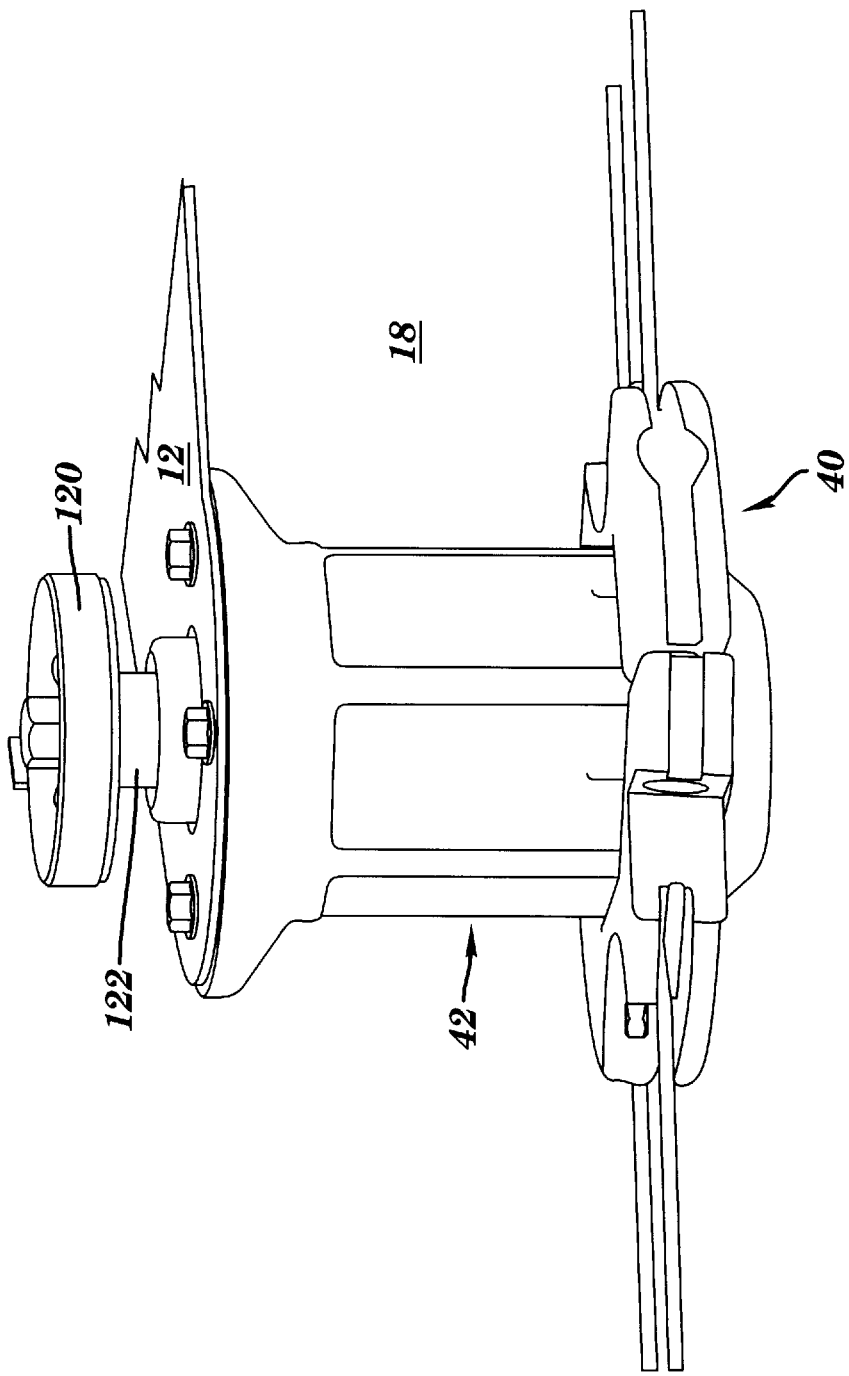

ADJUSTABLE MOWING AND TRIMMING APPARATUS

TECHNICAL FIELD

The invention relates generally to vegetation trimmers, and more particularly, to a combined mowing and trimming apparatus of a type that is mounted on a frame and supported on two wheels.

BACKGROUND ART

A variety of different types of mowing and trimming devices have been devised for meeting the requirements of particular applications. Conventional lawn maintenance, however, has required a lawn mower to cut the lawn and a lawn trimmer to trim the edges of the lawn, including areas of vegetation that border fences, buildings, etc. Flexible line vegetation trimmers are commonly used today for such trimming operations. Although the equipment for this two-part procedure is readily available, the procedure inherently involves a substantial duplication of effort since an operator must guide both types of equipment over substantially the same area, e.g., adjacent to buildings and other structures.

In response, various devices that combine mowing and trimming features in one machine have been developed. For example, such an apparatus is disclosed by Watrous in U.S. Pat. No. 2,669,826, wherein a two-wheel lawn mower is presented having a forwardly mounted cutting head that is supported on a ground engaging shoe. In Watrous the axle and housing are pivotally connected, thereby permitting the entire cutting head to swing from side to side with respect to the rear wheels and handle. This approach, however, disadvantageously leaves the handle in a position close to the structure around which vegetation trimming is to occur.

In U.S. Pat. No. 4,077,191 to Pittinger, a filament trimmer/mower is disclosed that includes a four wheel support frame. Each of the front and rear wheel-and-axle assemblies are pivotally mounted with respect to the frame. Pittinger, however, suffers from the disadvantage that the rotating head is held in a fixed position in the center of the frame between the wheels. Therefore, it is difficult to trim the vegetation growing alongside a building or other structure since the filament line would not normally extend outside the path of travel of the wheels.

Although there are numerous additional known devices in the art of combined mowing and trimming apparatus, there remains room in the art for further improvements to the known devices.

DISCLOSURE OF INVENTION

Briefly summarized, this invention comprises in one aspect a mowing and trimming apparatus which includes a frame having a front portion and a rear portion. A handle is secured to the frame at the rear portion and a trimming assembly is mounted to the front portion for rotational movement with a downwardly depending spindle. The trimming assembly has a plane of cutting substantially perpendicular to the axis of rotation of the spindle. An adjustable linkage is provided at the rear portion of the frame, with ground engaging wheels being mounted at opposite ends of the adjustable linkage. The linkage is coupled to the frame by a moveable pivot assembly. The apparatus further includes an adjustment mechanism for manually moving the moveable pivot assembly, and thereby the adjustable linkage, relative to the frame, wherein the trimming assembly remains substantially parallel to ground, and the rotatable trimming assembly, frame and handle remain fixed relative to each other notwithstanding turning of the ground engaging wheels in response to movement of the adjustable linkage.

In another aspect, the invention comprises a trimming assembly for use in a trimming apparatus having a spindle mounted to rotate about an axis of rotation. The trimming assembly includes a spindle head and a trimmer head. The spindle head is fixedly mounted to the spindle so as to rotate therewith and substantially cover an exposed portion of the spindle. The spindle head is sized such that a distal end thereof rests proximate to ground when the trimmer assembly is used in the trimming apparatus and the trimming apparatus is operational. The trimmer head, which is adjustably clamped about the spindle head so as to rotate therewith, has a plane of cutting substantially perpendicular to the axis of rotation. This plane of cutting is infinitely adjustable about a length of the spindle head such that height of the plane of cutting relative to ground is adjustable.

Various enhancements on the apparatus and assembly summarized above are also described and claimed herein.

A mowing and trimming apparatus in accordance with this invention has certain features which improve functionality, performance and durability. These features include a new trimming assembly design with improved height adjustability, spindle bearing protection and elimination of grass wrapping about the trimming assembly when the apparatus is operational. More particularly, a large range of height adjustment of the cutting plane, e.g., 1.5 inch–4.5 inch, is possible. Further, a large radius of the rotating group nearly eliminates the problem of grass wrapping, and the spindle head totally shields the spindle bearings and thus affords them protection from dirt, dust and material wrapping should it occur. As another advantage, improved exposure of the trimming head beyond the wheels is possible employing the wheel linkage and pivot adjustment assembly of the present invention. By simple actuation of an adjustment mechanism, the wheels are effectively steered between a left position, center position or right position, thus effectively placing the trimming assembly to either side of the wheels permitting convenient trimming along buildings, under fences, around trees, etc.

BRIEF DESCRIPTION OF DRAWINGS

The subject matter which is regarded as the present invention is particularly pointed out and distinctly claimed in the concluding portion of the specification. The invention, however, both as to organization and methods of practice, together with further objects and advantages thereof, may best be understood by reference to the following detailed description taken in conjunction with the accompanying drawings in which:

FIG. 4a is a side view of the trimmer head disc of FIG. 3;

FIG. 4b is a cross-sectional view of the trimmer head disc taken along lines B—B of FIG. 4a;

FIG. 7a is a side elevational view of the spindle head of FIG. 7;

FIGS. 7b & 7c are cross-sectional views of the spindle head of FIG. 7 taken along lines B—B and C—C, respectively, in FIG. 7a;

FIGS. 8a & 8b are perspective views of the trimming assembly in accordance with the present invention, each depicting a different position of the trimmer head relative to the spindle head;

BEST MODE FOR CARRYING OUT THE INVENTION

Figure 1:
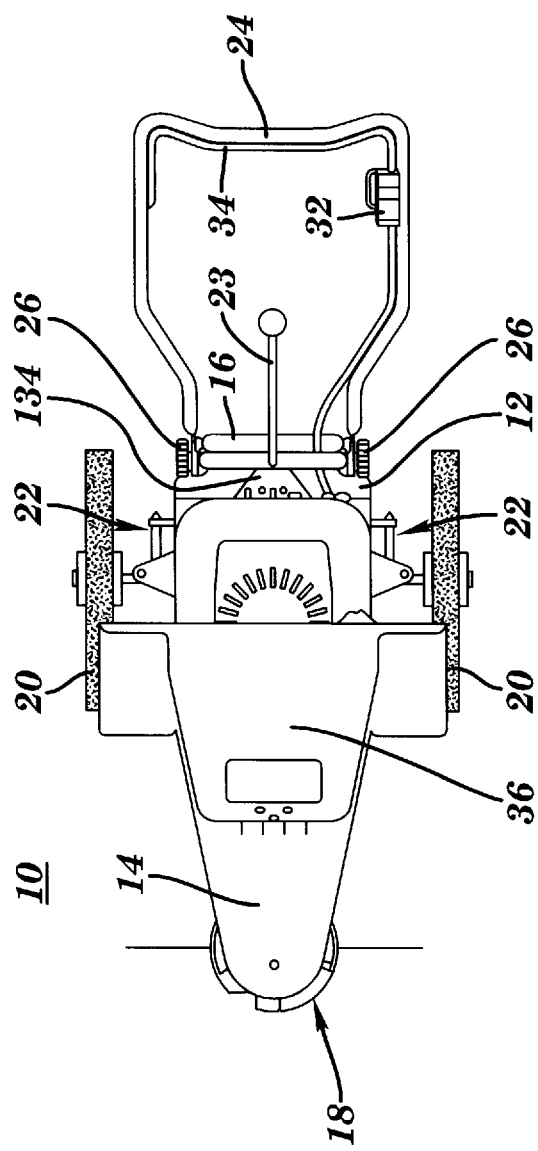
FIG. 1 is a top plan view of one embodiment of a mowing and trimming apparatus in accordance with the present invention.
Figure 2:
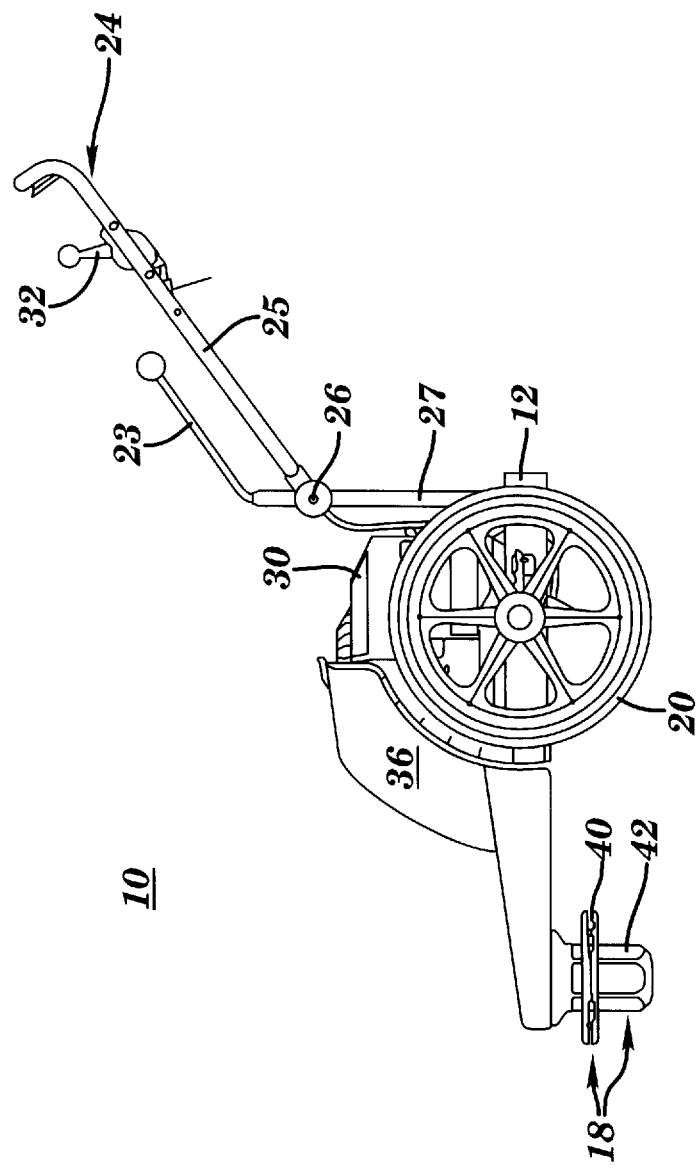
FIG. 2 is a side elevational view of the mowing and trimming apparatus of FIG. 1.

FIGS. 1 & 2 depict one embodiment of an adjustable mowing and trimming apparatus, generally denoted 10, in accordance with the present invention. Apparatus 10 includes a frame 12 having a front portion 14 and a rear portion 16. As one example, frame 12 comprises a lightweight and rigid aluminum structure sized for mounting all of the components of apparatus 10. The shape is designed so that a trimming assembly 18 is exposed at front portion 14 to facilitate unobstructed cutting of vegetation. In the example depicted, trimming assembly 18 comprises a line type trimmer, however, many of the novel concepts presented herein are applicable to blade type trimming assemblies as well.

Apparatus 10 comprises a two-wheeled structure having wheels 20 mounted at rear portion 16 on opposite sides of frame 12, but near the balance point of the apparatus. This is to minimize the weight supported by trimming assembly 18. Wheels 20 are relatively large for easy rolling and excellent maneuverability, even over rough terrain.

A wheel adjust mechanism 22 allows for significant, convenient pivoting of wheels 20 to change their orientation either to the left or to the right of frame 12, while still maintaining the wheels parallel. More particularly, mechanism 22 consists of a linkage, actuated by an operator, which steers and locks wheels 20 in a front-facing (centered) position, left oriented position or right oriented position. As can be envisioned by one of ordinary skill in the art, positioning of wheels 20 in either a left orientation or a right orientation relative to frame 12 results in trimming assembly 18 being placed to the right or left, respectively, of the parallel oriented wheels 20. In accordance with the present invention, the wheel adjust mechanism allows trimming assembly 18 to be more easily and completely exposed in the right or left position relative to the parallel oriented wheels 20 to provide improved trimming around buildings, fences, etc.

As described further below in connection with FIGS. 9 & 10, mechanism 22 is actuated by an operator lifting an arm 23, which disengages a locking pin engaged in a plate 134 at the end of the arm. Rotation of the arm about a vertical axis results in simultaneous pivoting of wheels 20 either to the left or to the right. At least a left locking position and a right locking position are provided in plate 134. As explained further below, wheel adjustment mechanism 22 can be distinguished from prior approaches of pivoting a conventional straight axle. In contrast, mechanism 22 comprises a linkage which is pivotally coupled through frame 12 to respond to a slight rotating of handle 23 either to the left or to the right. Wheels 20, which are connected at either end of the linkage respond by moving to the left orientation or the right orientation as discussed above. Because of the linkage design, this wheel movement is significantly more than that of arm 23, and more than otherwise attainable employing most any prior approach.

Connected to rear portion 16 of frame 12 is a handle assembly 24 having an upper portion 25 and a lower portion 27 coupled together pivotally 26 so that upper handle 25 can collapse to facilitate storage or transport of apparatus 10. Handle assembly 24 is fixedly secured to frame 12 and does not pivot with wheels 20. Upper handle portion 25 provides structure for an operator to propel the apparatus and provides mounting surface for a throttle 32 and an automatic shutoff 34. A conventional gasoline powered engine 30 is mounted to an upper surface of frame 12. However, those skilled in the art should note that the concepts presented herein are equally applicable to an electric powered trimming apparatus.

The crankshaft of engine 30 protrudes downward through a hole in frame 12 to an underside of the frame where a pulley attached to the crankshaft provides power to the belt drive and related components disposed on the underside of the frame. These components, which provide clutching/declutching and power transfer from the engine to the trimming assembly, are conventional. One skilled in the art is directed to any one of a number of commercially available cutting and trimming apparatus for further information on such components. The system preferably incorporates a braking feature tied to shutoff 34 to ensure that the trimming assembly does not rotate when shutoff 34 is disengaged from an operate position.

In the embodiment shown, a housing 36 partially shields engine 30, wheels 20, and an operator from any debris which may be thrown by the rotating trimming assembly 18. The housing also prevents tall cuttings from falling and becoming entangled in the engine or wheels. As depicted in FIG. 2, trimming assembly 18 comprises a trimmer head 40 and a spindle head 42. Preferred embodiments of these two components are depicted in FIGS. 3–8b, which are described below. Note that although depicted as hexagonal-shaped, any geometric shaped elongate spindle head and trimmer head center opening could be employed. For example, cylindrical, triangular or rectangular shapes could be used.

Figure 3:
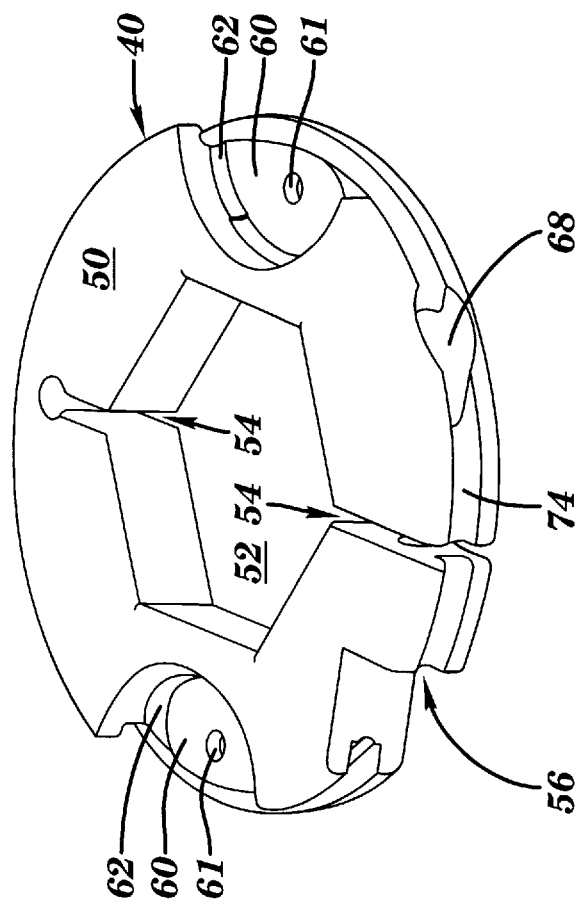
FIG. 3 is a perspective view of a trimmer head disc in accordance with the present invention.

FIGS. 3, 4a & 4b depict one embodiment of trimmer head 40 in accordance with the present invention. By way of example, trimmer head 40 could comprise a flat, round plastic disc approximately one inch thick and eight inches in diameter. Trimmer head 40 has a main body 50 within which in this embodiment a hexagonal-shaped center opening 52 is defined. Opening 52 is shaped and sized so that trimmer head 40 can encircle and clamp to spindle head 42 (FIG. 2). Radial grooves 54 are cut within body 50 to allow trimmer head 40 to slip over spindle head 42 and to facilitate clamping of head 40 onto spindle head 42.

Slots 54 essentially allow for a limited pivoting of the trimmer head body to allow the part to contract and decrease the size of hexagonal hole 52 slightly to thereby clamp trimmer head 40 to spindle head 42 (FIG. 2). A threaded fastener, or other type of clamping system, applies a load sufficient to contract the trimmer head and grip the spindle head. The threaded fastener (not shown) resides within a predefined opening 55 in the body 50 of the trimmer head. Opposite ends 56 & 58 of opening 55 are sized to facilitate the insertion of the threaded fastener, e.g., a bolt and a nut, into the opening and thereby clamping of the trimmer head to the spindle head. A feature of the trimmer head and spindle head combination presented herein is the infinite adjustability of the trimmer head relative to the spindle head within a range defined by a length of the spindle head, and thus an infinite adjustability of the vegetation cut height within a range defined by the length of the spindle head. Alternatively, however, the trimmer head could be designed to adjust in graduated movements relative to the elongate spindle head.

In the embodiment presented, trimmer head 40 is designed with two line receiving channels 62 on opposite sides. The channels and the structures which define the channels are identical and symmetrical about trimmer head 40. As shown in the assembled view of FIG. 6, each segment of line 90 is disposed such that a portion thereof adjacent each end extends from the trimmer head 40. The line segments 90 are held in place by clamps 80 which are bolted 81 to the body 50 of trimmer head 40.

Channels 62 are cut into body 50 such that a partially raised portion 60 remains having an elliptical or cam shape. Each portion 60 includes an opening 61 through body 50 which aligns with an opening 82 in a clamp plate 80 (see FIG. 5), within which a bolt 81 (FIG. 6) is to reside. Each channel 62 is defined by a first wall of elliptical shaped portion 60 and a second wall of main body 50. From the periphery of trimmer head 40 it can be seen that first wall 64 essentially comprises a convex shape extending inward from the circumference of the trimmer head, while curved second wall 66 comprises a concave, or more specifically, a substantially sinusoidal shaped wall.

In operation, the trimmer head will rotate clockwise, and therefore, the trimmer head includes a tapering 72 of first wall 64 and a tapering 70 of second wall 66 away from the direction of rotation so that a line residing within channel 62 will not experience a sharp edge where the line extends from the trimmer head. This extensive contouring of the walls defining channel 62 provides an advantage over prior line trimming assemblies, which typically have a very limited opening where the line exits the trimmer apparatus. Channel 62 also includes a slightly raised portion 68 to facilitate clamping of the line segment within the trimmer head.

Figure 5:
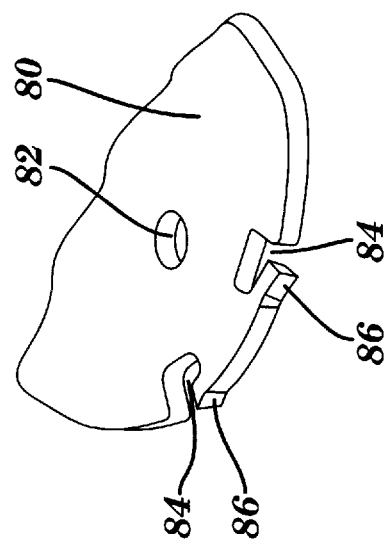
FIG. 5 is a perspective view of one embodiment of a clamp plate for securing trimming line in the trimmer head disc of FIGS. 3–4b.
Figure 6:
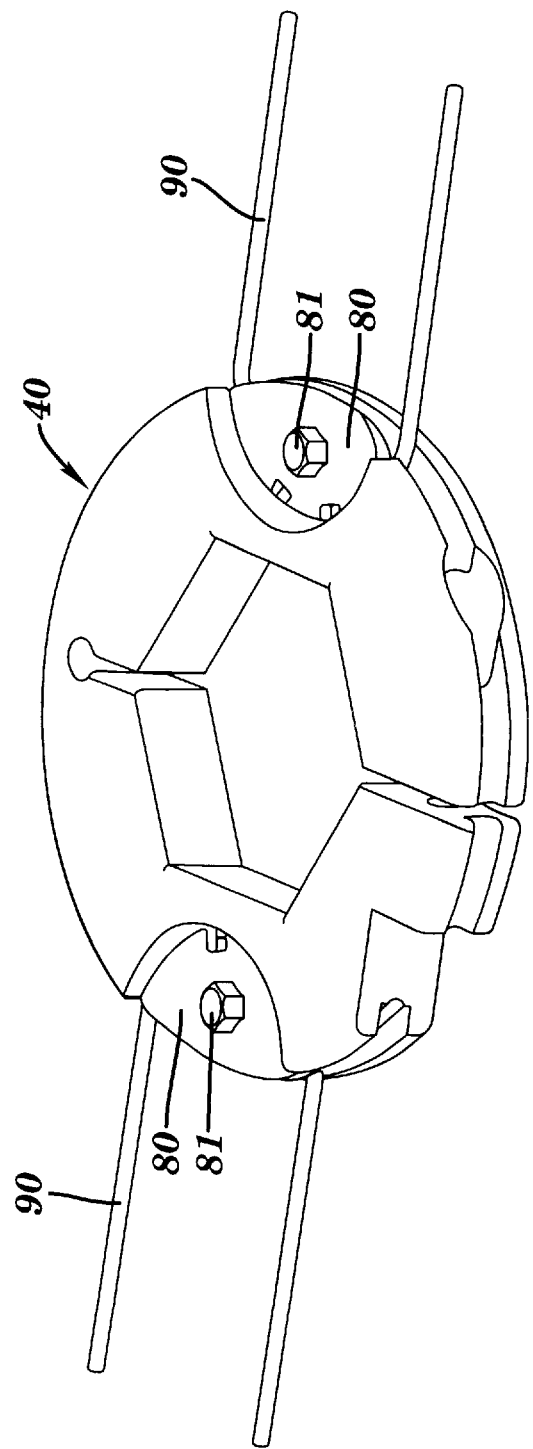
FIG. 6 is a perspective view of the trimmer head of the present invention with two trimming lines shown secured therein.

Referring to FIG. 5, clamp plate 80 is sized and shaped to cover a respective line receiving channel in the trimmer head. Clamp plate 80 includes cutouts 84 which are employed to define depending grips 86. When clamp plate 80 is bolted to body 50 of the trimmer head, grips 86 grab the line segment and hold the line segment in a fixed position. To replace a line segment, bolt 81 (FIG. 6) holding plate 80 (FIG. 5) to the body 50 of the trimmer head is loosened, releasing grippers 86 from engagement with the line segment, and thus allowing replacement of the line segment via its removal from channel 62 and insertion of a new line segment into the channel. Preferably, each line segment is clamped near a middle of the segment so that two roughly equal lengths of line extend outward from the trimmer head.

Trimmer head 40 also includes a groove 74 about the circumference of the trimmer head. This groove 74 is of sufficient width and depth to allow the line segments to "hide" within the groove whenever the trimmer head is inadvertently brought into physical contact with a fixed object. Should this happen, tapered portions 72 & 70 in the first wall 64 and second wall 66, respectively, prevent undue pressure from being applied to the line segments.

Figure 7:
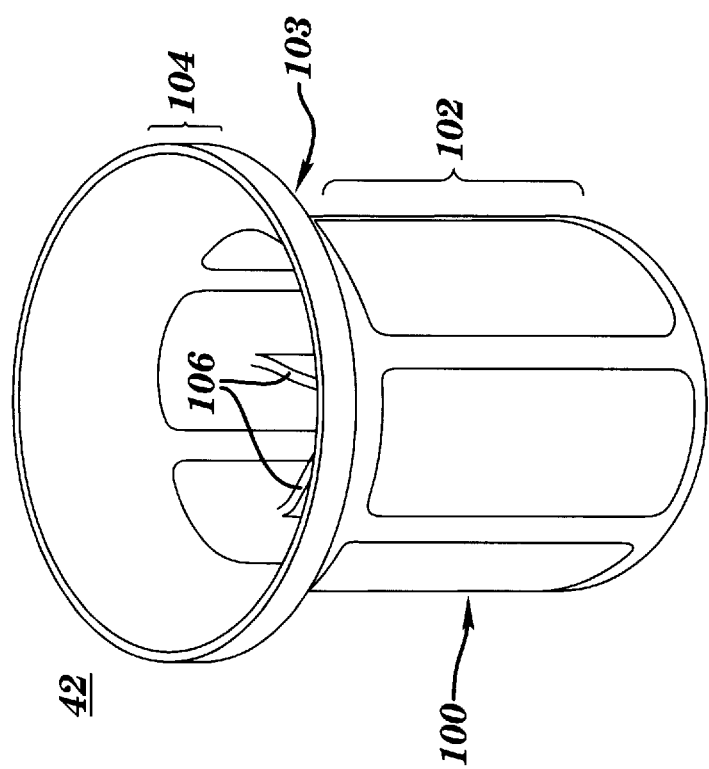
FIG. 7 is a perspective view of one embodiment of a spindle head in accordance with the present invention.

FIGS. 7–7c depict one embodiment of spindle head 42 in accordance with the present invention. Spindle head 42 comprises a cup-shaped structure 100 designed to encircle and rotate with an elongate spindle (not shown) driven by the drive belt and related components of the mowing and trimming apparatus. Structure 100 includes a first portion 102 which is hexagonal shaped and a second portion 104 which is cylindrical shaped. In use, second portion 104 comprises an upper portion and is adjacent to an under surface of frame 12 (FIG. 2), while the distal end 105 of the spindle head is designed to rest on the ground. Structure 100 includes a transition area 103 where the cross-sectional shape of the structure is tapered from the hex shape to the circular shape. Reinforcing ribs 106 extend radially from a center shaft 108 sized to receive the spindle (not shown) driven by the cutting and trimming apparatus. Again, those skilled in the art should recognize that the hexagonal-shaped spindle head and the corresponding hexagonal-shaped center opening in the trimmer head are provided herein by way of example only. Various other geometric shapes could be employed for the spindle head and trimmer head center opening.

As shown in FIG. 7b, a driving nut 110, for example, a star shaped washer, is secured within a corresponding opening in the distal end 105 of the spindle head. Driving nut 110 includes a hexagonal-shaped center opening which corresponds to a hexagonal-shaped spindle (not shown) to be received therein. Steps 109 are shown within shaft 108 for washers (not shown) which would encircle the spindle. Multiple drain openings 112 are provided in the distal end 105 of spindle head 42 to allow drainage of any moisture accumulated therein.

Spindle head 42, which is also constructed of plastic, has a diameter at least equal to three inches and preferably larger, e.g., 4" or 4.25". Such a large diameter, coupled with tapering 103 from the hexagonal portion 102 to the cylindrical portion 104 is responsible for significantly eliminating wrapping of cut fibrous material around the trimming assembly when the apparatus is in operation.

Figure 8A:
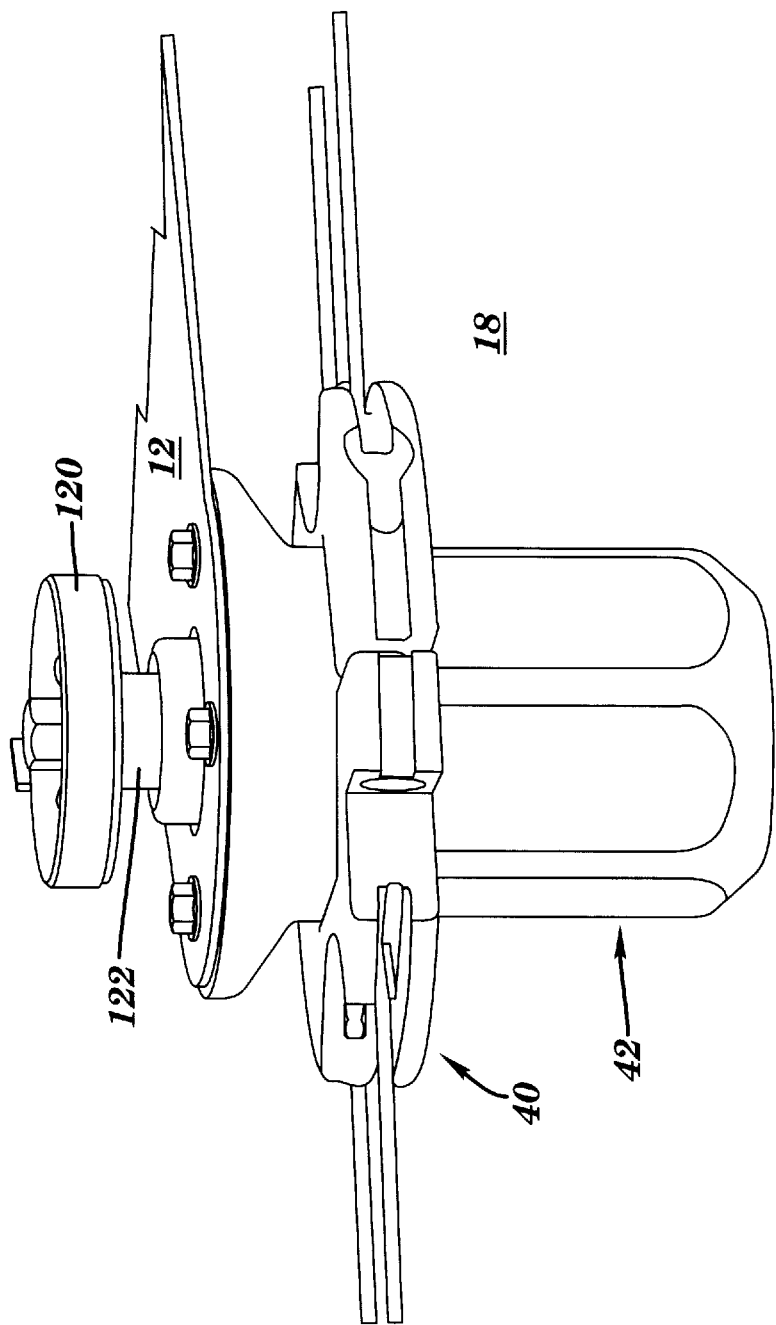

FIGS. 8a & 8b depict two operational embodiments of trimming assembly 18 to illustrate the range of adjustability of trimmer head 40 relative to spindle head 42. In addition to this wide range of adjustability, e.g., three inches or more, it is significant to note that the adjustability is infinite within the range provided. Thus, within this range an operator can set the cutting plane of the trimmer head to any desired height above ground. Assuming a three inch range of adjustability, then an operator might infinitely select cutting height within a range of approximately 1.5 inches to 4.5 inches as desired depending upon the type of vegetation being cut.

As best shown in these figures, spindle head 42 protects the spindle bearings (not shown) by being positioned close to the underside of frame 12 but slightly spaced therefrom to allow the spindle head to rotate relative to the frame. Spindle 122 is driven by a conventional belt drive assembly 120, which is powered by the engine of the cutting and trimming apparatus as noted above.

Figure 9:
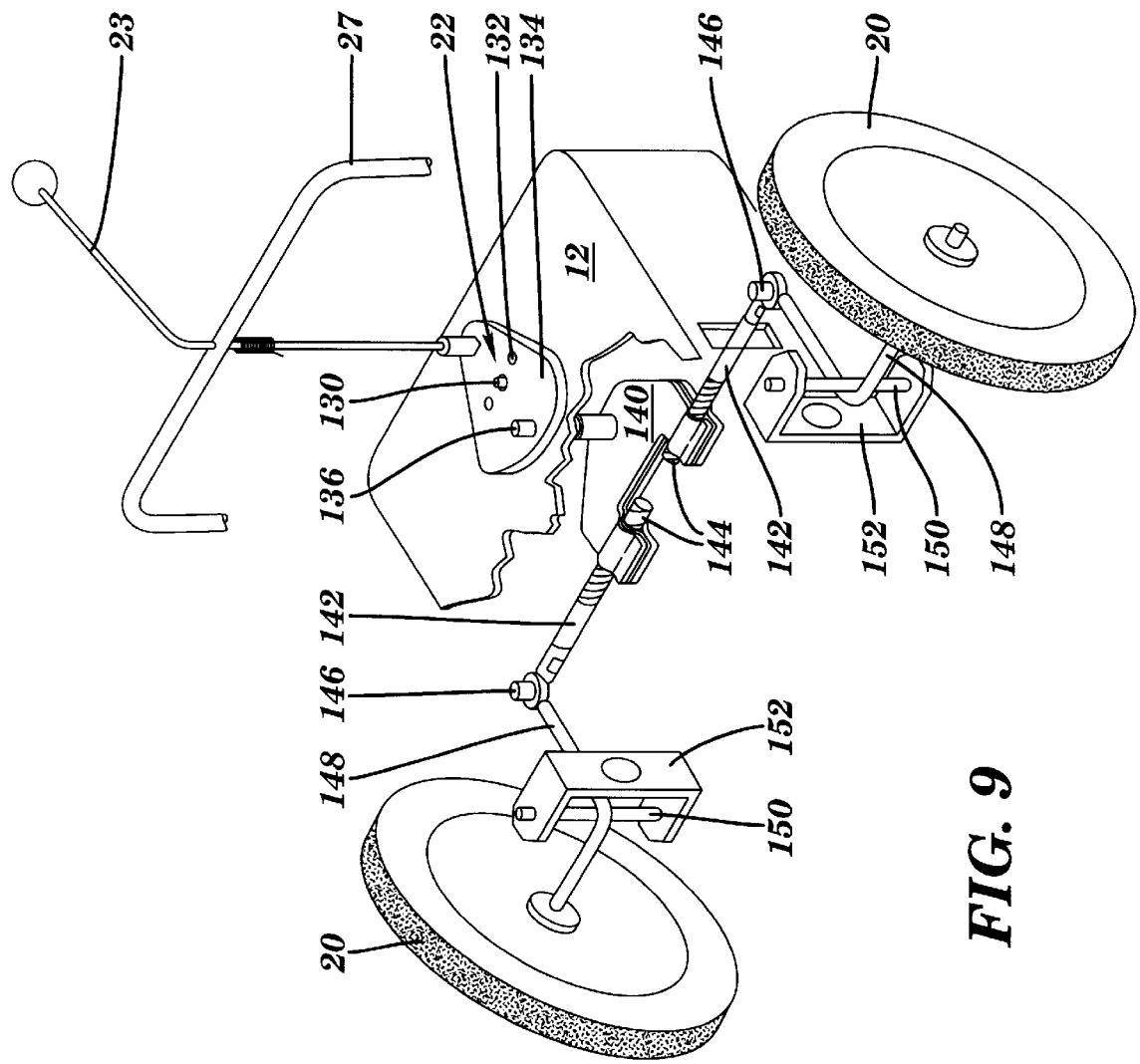
FIG. 9 is a perspective view of one embodiment of a wheel adjust mechanism in accordance with the present invention.
Figure 10:
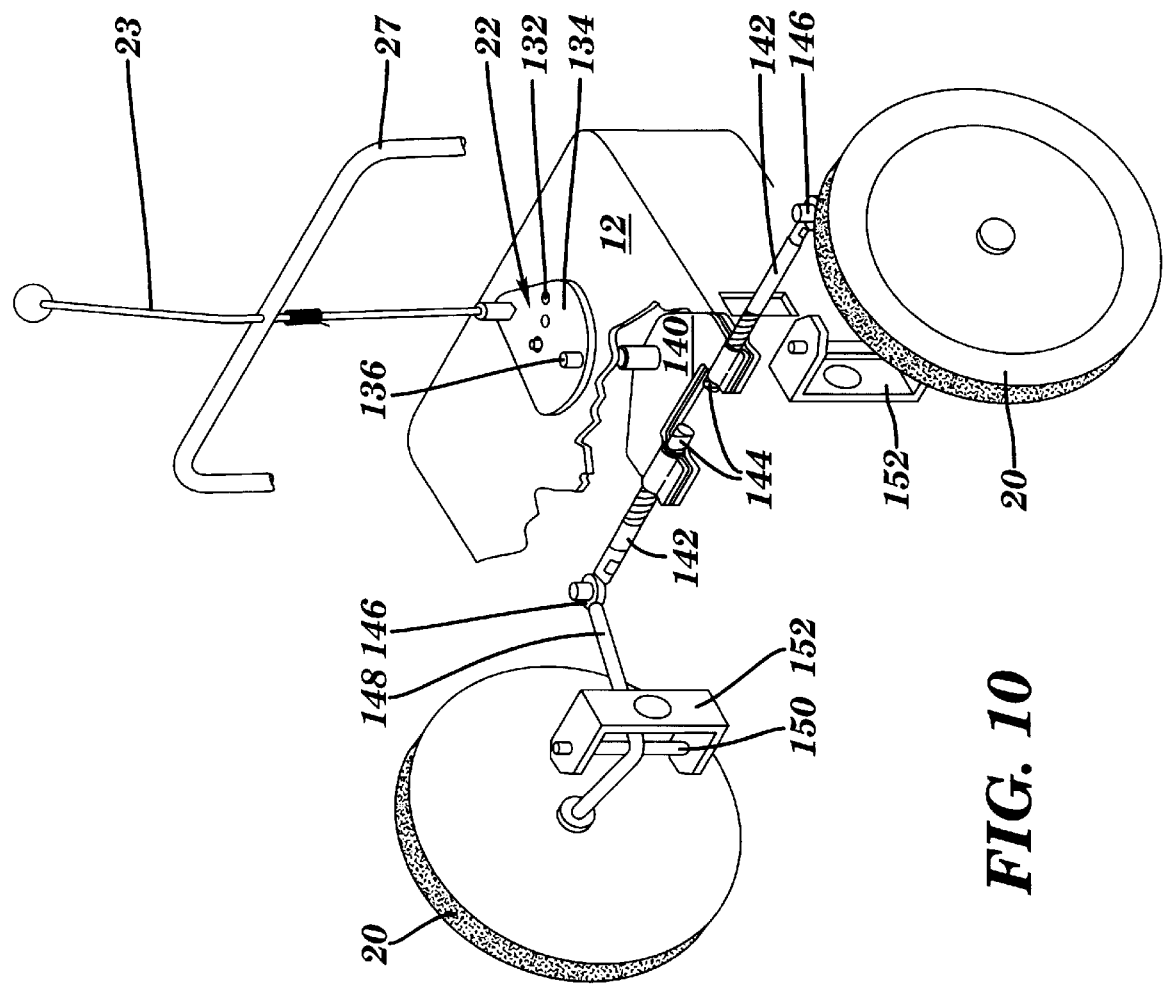
FIG. 10 is a perspective view of the assembly of FIG. 9 showing rotation of the wheels to a rightward orientation.

FIGS. 9 & 10 depict in greater detail one embodiment of a wheel adjust mechanism 22 in accordance with the present invention. As shown, mechanism 22 includes a handle 23, which passes through an opening in lower handle portion 27 sized to allow rotation of handle 23. A spring is disposed on the underside of handle portion 27 to maintain tension on handle 23 and thereby retain positioning of a locking pin 130 in one of at least three defined holes 132 in adjustable plate 134. Plate 134, which is securely connected to the lower end of handle 23 as shown, pivots about a pivot pin 136 and is spaced slightly from frame 12 to allow easy manual repositioning of locking pin 130 in a desired adjustment hole 132 through a simple raising and swinging motion applied to handle 23.

Disposed below frame 12 is a center clamp 140 fixedly secured to the other end of pivot pin 136. Clamp 140 can comprise two plates partially welded and secured together via threaded connection (not shown) to securely hold the ends of rods 142. Each rod 142 includes an area of abrasion, knurling, spline, or threading 144 to facilitate the clamping action. Advantageously, clamp 140 allows for exact parallel disposition of wheels 20 during the assembly process for the cutting and trimming apparatus. This is accomplished by loosening clamp 140 and adjusting the appropriate rod 142 as needed. Each rod 142 connects through a pivot structure 146 to an L-shaped rod or wheel arm 148. Each wheel arm is secured to a cylindrical post 150 near the bend in the arm. Each cylindrical post is loosely held within a corresponding wheel bracket 152 bolted to frame 12 such that the post 150 can rotate with pivoting of wheel arm 148 through pivot structure 146 in response to repositioning of plate 134 relative to locking pin 130.

In FIG. 9, the locking pin is shown disposed within the center adjustment hole 132 in plate 134, while in FIG. 10 the plate has been rotated so that the locking pin is now in the rightmost adjustment hole, which would cause the trimming assembly to be exposed on the left side of the parallel oriented wheels. Conversely, movement of plate 134 so that locking pin 130 is disposed in the leftmost opening (as viewed from the rear portion of frame 12) results in the trimming assembly being exposed beyond the right wheel of the apparatus. Note that multiple additional adjustment holes could also be provided in plate 134. Advantageously, the handle assembly remains fixedly disposed relative to the frame notwithstanding pivoting of the wheels and thus will be positioned away from the structure around which vegetation is being trimmed once the wheels are manually repositioned parallel to the structure.

Those skilled in the art should note from the above discussion that a mowing and trimming apparatus in accordance with this invention has certain features which improve functionality, performance and durability. These features include a new trimming assembly design with improved height adjustability, spindle bearing protection and elimination of grass wrapping about the trimming assembly when the apparatus is operational. More particularly, a large range of height adjustment of the cutting plane, e.g., 1.5 inch–4.5 inch, is possible. Further, a large radius of the rotating group nearly eliminates the problem of grass wrapping, and the spindle head totally shields the spindle bearings and thus affords them protection from dirt, dust and material wrapping should it occur. As another advantage, improved exposure of the trimming head beyond the wheels is possible employing the wheel linkage and pivot adjustment assembly of the present invention. By simple actuation of an adjustment mechanism, the wheels are effectively steered between a left position, center position or right position, thus effectively placing the trimming assembly to either side of the wheels permitting convenient trimming along buildings, under fences, around trees, etc.

While the invention has been described in detail herein in accordance with certain preferred embodiments thereof, many modifications and changes therein may be effected by those skilled in the art. For example, the trimming assembly could be fabricated to accommodate a single line segment or three or more line segments. Accordingly, it is intended by the appended claims to cover all such modifications and changes as fall within the true spirit and scope of the invention.

We claim:

1. A mowing and trimming apparatus, comprising:
   a frame having front and rear portions;
   a handle connected to said frame;
   a trimming assembly mounted for rotational movement on said frame at said front portion;
   means for rotating said trimming assembly about an axis of rotation, said trimming assembly having a plane of cutting substantially perpendicular to said axis of rotation;
   a linkage having opposite ends, said linkage being mounted to the frame and said linkage including a moveable pivot assembly;
   ground engaging wheels rotatably mounted at said opposite ends of said linkage; and
   means for adjusting said moveable pivot assembly to turn said ground engaging wheels relative to said frame, wherein the plane of cutting of said trimming assembly remains substantially parallel to ground, and the rotatable trimming assembly, frame and handle remain fixed relative to each other notwithstanding turning of the ground engaging wheels.

2. The mowing and trimming apparatus of claim 1, wherein said ground engaging wheels are oriented parallel to each other as said means for adjusting is employed to adjust the moveable pivot assembly, wherein said moveable pivot assembly comprises multiple distinct pivot positions, whereby said means for adjusting can be employed to move the ground engaging wheels between a leftward orientation, a center orientation and a rightward orientation relative to the frame.

3. The mowing and trimming apparatus of claim 2, wherein said linkage comprises a center clamp which adjustably holds two outwardly extending connector rods, and wherein on a distal end of each connector rod is located a pivot structure which couples the connector rod to a wheel arm that is connected to one ground engaging wheel of said ground engaging wheels, and wherein said linkage includes a pivot pin fixedly connected to said clamp and loosely coupled to said frame so as to pass therethrough.

4. The mowing and trimming apparatus of claim 3, wherein said moveable pivot assembly further comprises a plate secured to said pivot pin, said plate having at least three adjustment holes for selective engagement with a locking pin secured to said frame, wherein said means for adjusting comprises means for adjusting said plate to move said plate relative to said frame to selectively place one adjustment hole of the at least three adjustment holes over the locking pin, thereby selecting orientation of the ground engaging wheels relative to the frame.

5. The mowing and trimming apparatus of claim 1, wherein said trimming assembly comprises a trimmer head having at least one line for cutting vegetation, and wherein said frame comprises a housing which tapers to a width smaller than a diameter of said trimmer head at said axis of rotation of said trimming assembly, wherein a portion of the trimmer head and said at least one line are exposed beyond the housing.

6. The mowing and trimming apparatus of claim 1, further comprising a downwardly depending spindle mounted for rotational movement relative to said frame at said axis of rotation of said trimming assembly, said trimming assembly being mounted about said spindle for rotational movement therewith, and wherein said trimming assembly is adjustable to move the plane of cutting downwards or upwards along said downwardly depending spindle.

7. The mowing and trimming apparatus of claim 6, wherein the trimming assembly comprises a trimmer head and a spindle head, said spindle head being fixedly mounted to said spindle so as to rotate therewith, and wherein said trimmer head defines the plane of cutting and is mounted over said spindle head so as to adjust relative thereto and thereby move the plane of cutting, said spindle head being sized such that a distal end thereof rests directly on ground when said mowing and trimming apparatus is in operation.

8. The mowing and trimming apparatus of claim 7, wherein said spindle head comprises a first portion and a second portion, said first portion having a hexagonal cross-sectional shape transverse to said spindle and said second portion having a circular cross-sectional shape transverse to said spindle, said first portion tapering into said second portion, and wherein said second portion is disposed adjacent to said frame.

9. The mowing and trimming apparatus of claim 7, wherein said trimmer head comprises a first line and a second line for cutting vegetation, and wherein said trimmer head is disc shaped with a first curved channel and a second curved channel disposed symmetrically opposite each other in said trimmer head, said trimmer head further comprising a first clamp and a second clamp, said first clamp being sized and shaped to clamp the first line in the first channel of the trimmer head and said second clamp being sized and shaped to clamp the second line in the second channel of the trimmer head.

10. The mowing and trimming apparatus of claim 9, wherein the first channel and the second channel comprise identical channels within the trimmer head and said first clamp and said second clamp comprise identical plates, wherein when the first line is secured within the trimmer head by the first clamp, a first end and a second end of the first line extend outward from the trimmer head, and wherein when the second line is secured within the second channel of the trimmer head by the second clamp, a first end and a second end of the second line extend outward from the trimmer head.

11. The mowing and trimming apparatus of claim 9, wherein the trimmer head includes a groove in a circumference thereof sized to receive the first line and the second line should the trimmer head impact an object when the trimming assembly is rotating.

12. The mowing and trimming apparatus of claim 11, wherein the first channel and the second channel comprise identically shaped channels formed in the trimmer head, each identically shaped channel being defined by a first wall and a second wall, said first wall having a convex shape extending inward from a periphery of the trimmer head, and said second wall having a substantially sinusoidal shape extending from a first peripheral location to a second peripheral location of the trimmer head.

13. The mowing and trimming apparatus of claim 12, wherein said second wall of each identically shaped channel tapers into a base of the groove in the circumference of the trimmer head.

14. A trimming assembly for use in a trimming apparatus having a spindle mounted to rotate about an axis of rotation, said trimming assembly comprising:
    a spindle head fixedly mounted to said spindle so as to rotate therewith, said spindle head substantially covering an exposed portion of said spindle and being sized such that a distal end thereof rests proximate to the ground when the trimming assembly is used in the trimming apparatus and the trimming apparatus is operational; and
    a trimmer head adjustably clamped about said spindle head so as to rotate therewith, said trimmer head having a plane of cutting substantially perpendicular to said axis of rotation, wherein when the trimming assembly is used within the trimming apparatus and the trimming apparatus is in operation, said spindle head is substantially perpendicular to the ground and the plane of cutting is substantially parallel to the ground, and said trimmer head is adjustable relative to said spindle head such that height of the plane of cutting height relative to the ground is adjustable.

15. The trimming assembly of claim 14, wherein the spindle head is hexagonal shaped in cross section transverse to the axis of rotation and the trimmer head has a hexagonal-shaped center opening sized to allow the spindle head to pass therethrough, and wherein the trimmer head encircles the spindle head and is adjustable relative thereto.

16. The trimming assembly of claim 15, wherein the hexagonal shaped spindle head is at least four inches in diameter to inhibit wrapping of cuttings therearound.

17. The trimming assembly of claim 14, wherein said spindle head comprises a first portion and a second portion, said first portion having said hexagonal cross-section transverse to said axis of rotation, and said second portion having a circular cross-section transverse to said axis of rotation, said first portion tapering into said second portion, and wherein when the trimming assembly is used in the trimming apparatus, the first portion of the spindle head resides adjacent to and partially covers spindle bearings for said spindle.

18. The trimming assembly of claim 14, wherein the trimmer head comprises a disc-shaped line trimmer having at least one line held therein within at least one channel, each channel being defined by a first wall and a second wall, both said first wall and said second wall beginning and ending at a periphery of the trimmer head, said first wall having a convex shape extending radially inward from the periphery of the trimmer head and said second wall having a concave shape extending radially inward from the periphery of the trimmer head, said second wall being in at least partial opposing relation to said first wall to thereby define said at least one channel, and wherein said trimmer head further comprises means for clamping said at least one line within said at least one channel.

19. The trimming assembly of claim 18, wherein said at least one line comprises two lines and said at least one channel comprises two identical channels formed within said trimming head, each of said identical channels receiving a different line.

20. The trimming assembly of claim 19, wherein said trimming head further comprises a circumferential groove sized to receive the two lines when the trimming assembly is in use within the trimming apparatus and the trimmer head is brought in contact with an object, and wherein said second wall of each identical channel curves into and becomes a base of the circumferential groove.

21. A mowing and trimming apparatus, comprising:
    a frame having front, rear and opposing side portions;
    a handle assembly connected to the rear portion of said frame;
    a trimming assembly mounted for rotational movement on said frame at said front portion;

means for rotating said trimming assembly about an axis of rotation, said trimming assembly having a plane of cutting substantially perpendicular to said axis of rotation;

a linkage having wheel arms at opposite ends, said linkage being mounted to the frame so that each arm protrudes from an opposite side thereof and said linkage being operable to simultaneously turn the arms through various positions ranging from a wheels left position to a wheels right position;

a ground engaging wheel rotatably mounted on each arm; and means operably coupled to the linkage for manually operating same through its various positions, wherein the plane of cutting of said trimming assembly remains substantially parallel to ground, and the rotatable trimming assembly, frame and handle remain fixed relative to each other notwithstanding turning of the ground engaging wheels.

22. The apparatus of claim 21 wherein the ground engaging wheels remain substantially parallel to each other as the linkage is operated through its various positions.

23. The apparatus of claim 21 wherein the linkage comprises a center clamp which adjustably holds two outwardly extending connector rods and wherein on a distal end of each connector rod is located a pivot structure which couples the connector rod to the wheel arm.

24. The apparatus of claim 21 wherein the operating means comprises a movable pivot assembly.

25. The apparatus of claim 24 in which the movable pivot assembly further comprises a plate secured to a pivot pin, said plate having at least three adjustment holes for selective engagement with a locking pin secured to said frame for selecting orientation of the ground engaging wheels relative to the frame.

26. The apparatus of claim 21 wherein said trimming assembly comprises a trimmer head having at least one line for cutting vegetation, and wherein said frame comprises a housing which tapers to a width smaller than a diameter of said trimmer head at said axis of rotation of said trimming assembly, wherein a portion of the trimmer head and said at least one line are exposed beyond the housing.

27. The apparatus of claim 21 further comprises a downwardly depending spindle mounted for rotational movement relative to said frame at said axis of rotation of said trimming assembly, said trimming assembly being mounted about said spindle for rotational movement therewith, and wherein said trimming assembly is adjustable to move the plane of cutting downwards or upwards along said downwardly depending spindle.

28. The apparatus of claim 27 wherein the trimming assembly comprises a trimmer head and a spindle head, said spindle head being fixedly mounted to said spindle so as to rotate therewith, and wherein said trimmer head defines the plane of cutting and is mounted over said spindle head so as to adjust relative thereto and thereby move the plane of cutting, said spindle head being sized such that a distal end thereof rests directly on ground when said mowing and trimming apparatus is in operation.

29. The apparatus of claim 28 wherein said spindle head comprises a first portion and a second portion, said first portion having a hexagonal cross-sectional shape transverse to said spindle and said second portion having a circular cross-sectional shape transverse to said spindle, said first portion tapering into said second portion, and wherein said second portion is disposed adjacent to said frame.

30. The apparatus of claim 28 wherein said trimmer head comprises a first line and a second line for cutting vegetation, and wherein said trimmer head is disc shaped with a first curved channel and a second curved channel disposed symmetrically opposite each other in said trimmer head, said trimmer head further comprising a first clamp and a second clamp, said first clamp being sized and shaped to clamp the first line in the first channel of the trimmer head and said second clamp being sized and shaped to clamp the second line in the second channel of the trimmer head.

31. The apparatus of claim 30 wherein the first channel and the second channel comprise identical channels within the trimmer head and said first clamp and said second clamp comprise identical plates, wherein when the first line is secured within the trimmer head by the first clamp, a first end and a second end of the first line extend outward from the trimmer head, and wherein when the second line is secured within the second channel of the trimmer head by the second clamp, a first end and a second end of the second line extend outward from the trimmer head.

32. The apparatus of claim 30 wherein the trimmer head includes a groove in a circumference thereof sized to receive the first line and the second line should the trimmer head impact an object when the trimming assembly is rotating.

33. The apparatus of claim 32 wherein the first channel and the second channel comprise identically shaped channels formed in the trimmer head, each identically shaped channel being defined by a first wall and a second wall, said first wall having a convex shape extending inward from a periphery of the trimmer head, and said second wall having a substantially sinusoidal shape extending from a first peripheral location to a second peripheral location of the trimmer head.

34. The apparatus of claim 33 wherein the second wall of each identically shaped channel tapers into a base of the groove in the circumference of the trimmer head.

* * * * *